United States Patent
Ogawa et al.

(10) Patent No.: US 9,464,842 B2
(45) Date of Patent: Oct. 11, 2016

(54) CARBON DIOXIDE SEPARATING AND CAPTURING SYSTEM AND METHOD OF OPERATING SAME

(71) Applicant: Kabushiki Kaisha Toshiba, Minato-ku (JP)

(72) Inventors: Takashi Ogawa, Yokohama (JP); Hideo Kitamura, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 158 days.

(21) Appl. No.: 14/155,613

(22) Filed: Jan. 15, 2014

(65) Prior Publication Data

US 2015/0027164 A1 Jan. 29, 2015

(30) Foreign Application Priority Data

Jul. 29, 2013 (JP) ................................. 2013-157045

(51) Int. Cl.
*B01D 53/14* (2006.01)
*F25J 3/00* (2006.01)

(52) U.S. Cl.
CPC .............. *F25J 3/00* (2013.01); *B01D 53/1425* (2013.01); *B01D 53/1475* (2013.01); *B01D 2258/0283* (2013.01); *Y02C 10/04* (2013.01); *Y02C 10/06* (2013.01)

(58) Field of Classification Search
CPC .............. B01D 2252/204; B01D 2252/20478; B01D 2257/504; B01D 2258/0283; B01D 2259/65; B01D 53/1425; B01D 53/1475; B01D 53/62; B01D 53/78; B01D 53/96; F23J 15/02; F23J 2215/50; F23J 2219/40; F25J 3/08; Y02C 10/06
See application file for complete search history.

(56) References Cited

U.S. PATENT DOCUMENTS

2006/0032377 A1 2/2006 Reddy et al.
2007/0283813 A1 12/2007 Iijima et al.
(Continued)

FOREIGN PATENT DOCUMENTS

CA  2 757 781 A1  5/2012
EP  0 568 175 A3  3/1994
(Continued)

OTHER PUBLICATIONS

Partial European Search Report issued Jan. 7, 2015 in European Patent Application No. 14151478.6.
(Continued)

*Primary Examiner* — Duane Smith
*Assistant Examiner* — Cabrena Holecek
(74) *Attorney, Agent, or Firm* — Oblon, McClelland, Maier & Neustadt, L.L.P.

(57) ABSTRACT

In one embodiment, a carbon dioxide separating and capturing system includes an absorption tower to allow a gas containing carbon dioxide to contact with an absorption liquid and discharge a first rich liquid which is the absorption liquid having absorbed the carbon dioxide, and a regeneration tower to cause the absorption liquid to release a gas containing the carbon dioxide and discharge a lean liquid whose carbon dioxide concentration is lower than that of the rich liquid. The system further includes a reboiler to heat the absorption liquid in the regeneration tower by using steam, and a flow divider to divide the first rich liquid into second and third rich liquids. The system further includes a first heat exchanger to heat the second rich liquid by using the lean liquid, and a second heat exchanger to heat the third rich liquid by using water discharged from the reboiler.

10 Claims, 7 Drawing Sheets

(56) References Cited

U.S. PATENT DOCUMENTS

| | | | |
|---|---|---|---|
| 2010/0229723 A1* | 9/2010 | Gelowitz | B01D 53/1425 95/162 |
| 2011/0113965 A1 | 5/2011 | Iijima et al. | |
| 2011/0113966 A1 | 5/2011 | Iijima et al. | |
| 2011/0120315 A1 | 5/2011 | Iijima et al. | |
| 2011/0203314 A1 | 8/2011 | Mak | |
| 2011/0277479 A1* | 11/2011 | Richter | B01D 53/1425 60/685 |
| 2012/0118162 A1* | 5/2012 | Ogawa | B01D 53/1475 96/242 |
| 2012/0125196 A1 | 5/2012 | Woodhouse et al. | |
| 2013/0000301 A1 | 1/2013 | Mattstedt et al. | |
| 2013/0323147 A1 | 12/2013 | Iijima et al. | |
| 2014/0345465 A1 | 11/2014 | Taniguchi et al. | |

FOREIGN PATENT DOCUMENTS

| | | |
|---|---|---|
| EP | 0 588 175 A2 | 3/1994 |
| EP | 1 736 231 A1 | 12/2006 |
| EP | 2 455 154 A1 | 5/2012 |
| EP | 2 581 129 A1 | 4/2013 |
| JP | 2004-323339 A | 11/2004 |
| JP | 2012-106180 A | 6/2012 |
| WO | WO 2011/132660 A1 | 10/2011 |
| WO | WO 2013/088731 A1 | 6/2013 |

OTHER PUBLICATIONS

Office Action issued May 18, 2015 in Australian Patent Application No. 2014200434.

Extended Search Report issued May 13, 2015 in European Patent Application No. 14151478.6.

Chinese Office Action issued in Application No. 201410045872.X on Dec. 3, 2015 (w/ English translation).

Office Action issued on Apr. 26, 2016 in Australian Patent Application No. 2014200434.

Chinese Office Action issued in Application No. 201410045872.X on Jul. 25, 2016 (w/ English Translation).

\* cited by examiner

CARBON DIOXIDE SEPARATING AND CAPTURING SYSTEM AND METHOD OF OPERATING SAME

CROSS REFERENCE TO RELATED APPLICATION

This application is based upon and claims the benefit of priority from the prior Japanese Patent Application No. 2013-157045, filed on Jul. 29, 2013, the entire contents of which are incorporated herein by reference.

FIELD

Embodiments described herein relate to a carbon dioxide separating and capturing system and a method of operating the same.

BACKGROUND

Regarding capturing of carbon dioxide, carbon dioxide capture and storage technology has recently received attention as an effective measure against global warming issues concerned on a global mass scale. In particular, a method of capturing carbon dioxide by using an aqueous solution has been studied in association with a thermal power plant and a process exhaust gas. For example, a carbon dioxide capturing apparatus is known which includes an absorption tower configured to generate a rich liquid by causing an absorption liquid to absorb a gas containing carbon dioxide, and a regeneration tower configured to heat the rich liquid discharged from the absorption tower to release the carbon dioxide and steam, separate the carbon dioxide from the steam, and return a generated lean liquid to the absorption tower.

In the step of releasing the carbon dioxide from the rich liquid, a reboiler provided adjacent to the regeneration tower circulates and heats the absorption liquid in the regeneration tower. The reboiler is supplied with a part of steam (water vapor) generated for using in a thermal power plant, a factory or the like as a heating medium. An amount of the steam supplied to the reboiler is required to be reduced.

DETAILED DESCRIPTION

Embodiments will now be explained with reference to the accompanying drawings.

In one embodiment, a carbon dioxide separating and capturing system includes an absorption tower to which a gas containing carbon dioxide is introduced, the absorption tower being configured to allow the gas to contact with an absorption liquid for absorbing the carbon dioxide, and to discharge a first rich liquid which is the absorption liquid having absorbed the carbon dioxide, and a regeneration tower configured to cause the absorption liquid to release a gas containing the carbon dioxide, and to discharge a lean liquid whose carbon dioxide concentration is lower than a carbon dioxide concentration of the rich liquid. The system further includes a reboiler configured to heat the absorption liquid in the regeneration tower by using steam, and a flow divider configured to divide the first rich liquid into a second rich liquid and a third rich liquid. The system further includes a first heat exchanger configured to heat the second rich liquid fed from the flow divider to the regeneration tower by using the lean liquid fed from the regeneration tower to the absorption tower, and a second heat exchanger configured to heat the third rich liquid fed from the flow divider directly into the second heat exchanger and fed to the regeneration tower by using water discharged from the reboiler.

(First Embodiment)

Figure 1:
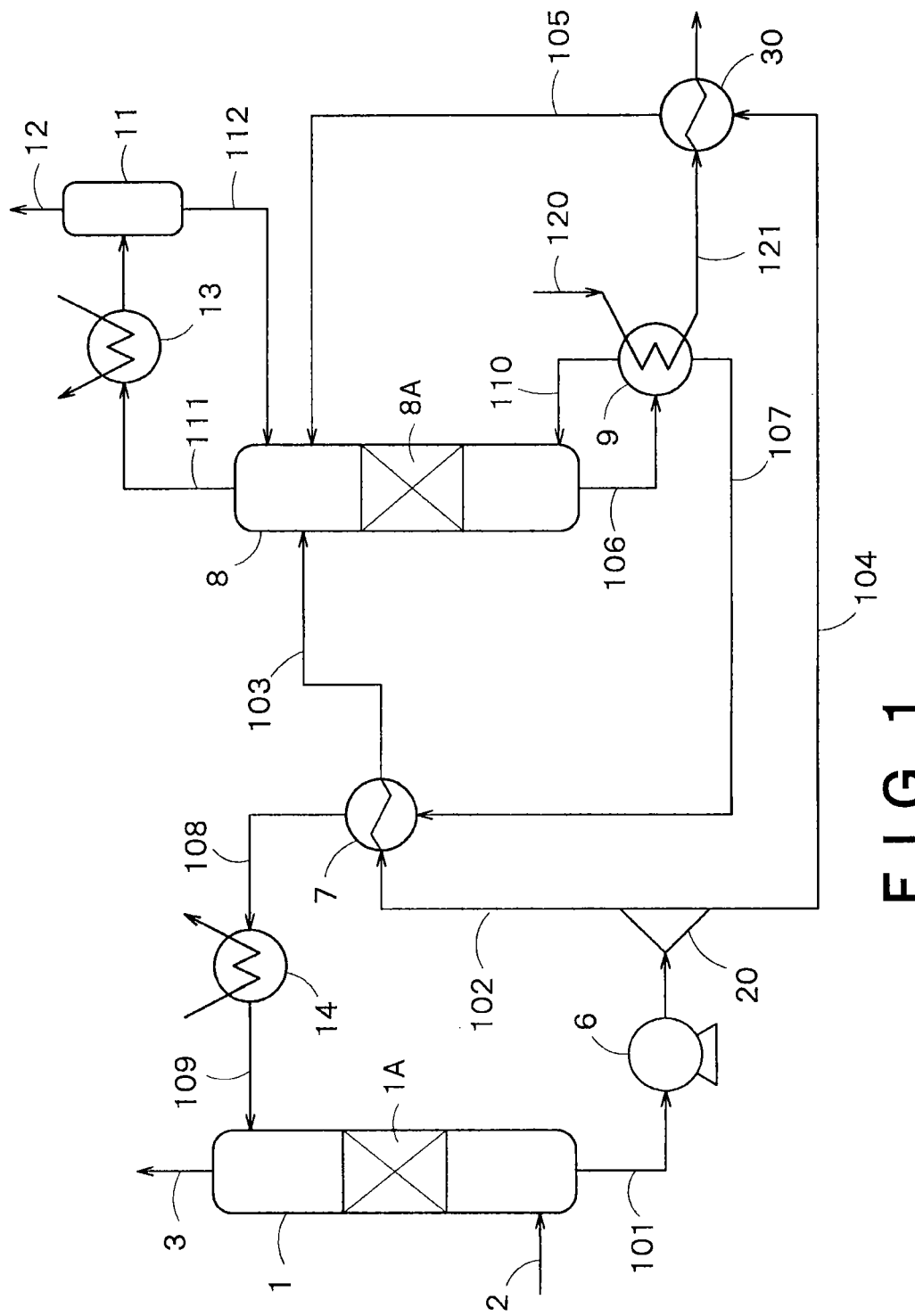
FIG. 1 is a schematic configuration diagram of a carbon dioxide separating and capturing system of a first embodiment.

FIG. 1 is a schematic configuration diagram of a carbon dioxide separating and capturing system of a first embodiment. As shown in FIG. 1, the carbon dioxide separating and capturing system includes an absorption tower 1, a regenerative heat exchanger 7, a regeneration tower 8, a reboiler 9 and a flow divider 20. The carbon dioxide separating and capturing system captures a carbon dioxide gas 12 from a combustion exhaust gas 2 by using an absorption liquid for absorbing carbon dioxide, and discharges a carbon dioxide-released gas 3.

The combustion exhaust gas 2 is generated, for example, from a boiler (not shown) of a thermal power plant and introduced to a lower portion of the absorption tower 1. In the absorption tower 1, the combustion exhaust gas 2 contacts with the absorption liquid, and the carbon dioxide in the combustion exhaust gas 2 is absorbed in the absorption liquid. The absorption liquid is introduced from an upper portion of the absorption tower 1, passes through a packed bed 1A which is filled with filler for enhancing efficiency of gas-liquid contact, and flows down in the absorption tower 1. For example, an amine compound can be used as the absorption liquid.

The greater part of the carbon dioxide in the combustion exhaust gas 2 is absorbed in the absorption liquid, and the carbon dioxide-released gas 3 whose carbon dioxide content is reduced is discharged from a top of the absorption tower 1.

In a bottom portion of the absorption tower 1, a rich liquid 101 which is the absorption liquid having absorbed the carbon dioxide is collected. The rich liquid 101 collected in the bottom portion of the absorption tower 1 is discharged from the bottom portion of the absorption tower 1, and fed to the flow divider 20 by a rich liquid transferring pump 6.

The flow divider 20 divides the rich liquid 101 (first rich liquid) into a main rich liquid (second rich liquid) 102 and a sub-rich liquid (third rich liquid) 104.

The main rich liquid 102 is heated with a lean liquid 107 discharged from the regeneration tower 8 (reboiler 9) at the regenerative heat exchanger (first heat exchanger) 7. The heated main rich liquid 103 is fed to the regeneration tower 8.

The sub-rich liquid 104 is heated with hot water 121 discharged from the reboiler 9 at a heat exchanger (second heat exchanger) 30. A sub-rich liquid 105 that has been heated is fed to the regeneration tower 8.

The main rich liquid 103 and the sub-rich liquid 105 fed to the regeneration tower 8 pass through a packed bed 8A which is filled with filler for enhancing efficiency of gas-liquid contact, and flow down in the regeneration tower 8. They undergo counterflow contact with a mixture gas 110 as a mixture of the carbon dioxide and steam generated at the reboiler 9 to be heated, and release the carbon dioxide to be collected in a bottom portion of the regeneration tower 8 as a semi-lean liquid 106. The semi-lean liquid 106 collected in the bottom portion of the regeneration tower 8 is discharged from the bottom portion of the regeneration tower 8, heated at the reboiler 9 and separated into the mixture gas 110 of the carbon dioxide and the steam and the hot lean liquid 107.

The reboiler 9 is supplied with steam 120, and heats the semi-lean liquid 106 by using this steam 120 as a heat source. The steam 120 is discharged from the reboiler 9 as the hot water 121 after heating the semi-lean liquid 106 at the reboiler 9. The hot water 121 is fed to the heat exchanger 30 to heat the sub-rich liquid 104.

The lean liquid 107 heats the main rich liquid 102 at the regenerative heat exchanger 7. A lean liquid 108 having passed through the regenerative heat exchanger 7 is cooled by a lean liquid cooler 14 and fed to the upper portion of the absorption tower 1. A lean liquid 109 fed to the absorption tower 1 is reused for absorbing the carbon dioxide in the combustion exhaust gas 2.

An exhaust gas 111 containing the carbon dioxide gas and the steam released from the absorption liquid at the regeneration tower 8 is discharged from a top of the regeneration tower 8. The gas 111 discharged from the regeneration tower 8 is cooled by a regeneration tower reflux condenser 13 to condense moisture, and separated from condensed water 112 by a gas-liquid separator (condenser) 11 so as to discharge the carbon dioxide gas 12. Meanwhile, the condensed water 112 separated by the gas-liquid separator 11 is partly or entirely returned to the regeneration tower 8 for the purpose that a water concentration in the absorption liquid is held constant.

In the present embodiment, the sub-rich liquid 104 is heated with the hot water 121 discharged from the reboiler 9, so that sensible heat of the hot water 121 can be recovered to the regeneration tower 8. In other words, heat recovery per unit from the steam 120 fed to the reboiler 9 can be increased. Therefore, a feed of the steam 120 to the reboiler 9 can be reduced compared with a case where heat recovery is not performed from the hot water 121.

A flow rate of the sub-rich liquid 104 is preferably equal to or smaller than 20% of a flow rate of the rich liquid 101 and more preferably equal to or smaller than 10% thereof. When the flow rate of the sub-rich liquid 104 is made excessively large, a flow rate of the main rich liquid 102 becomes too small. This reduces both efficiency of heat recovery from the lean liquid 107 at the regenerative heat exchanger 7 and operation efficiency over the entire system.

(Second Embodiment)

Figure 2:
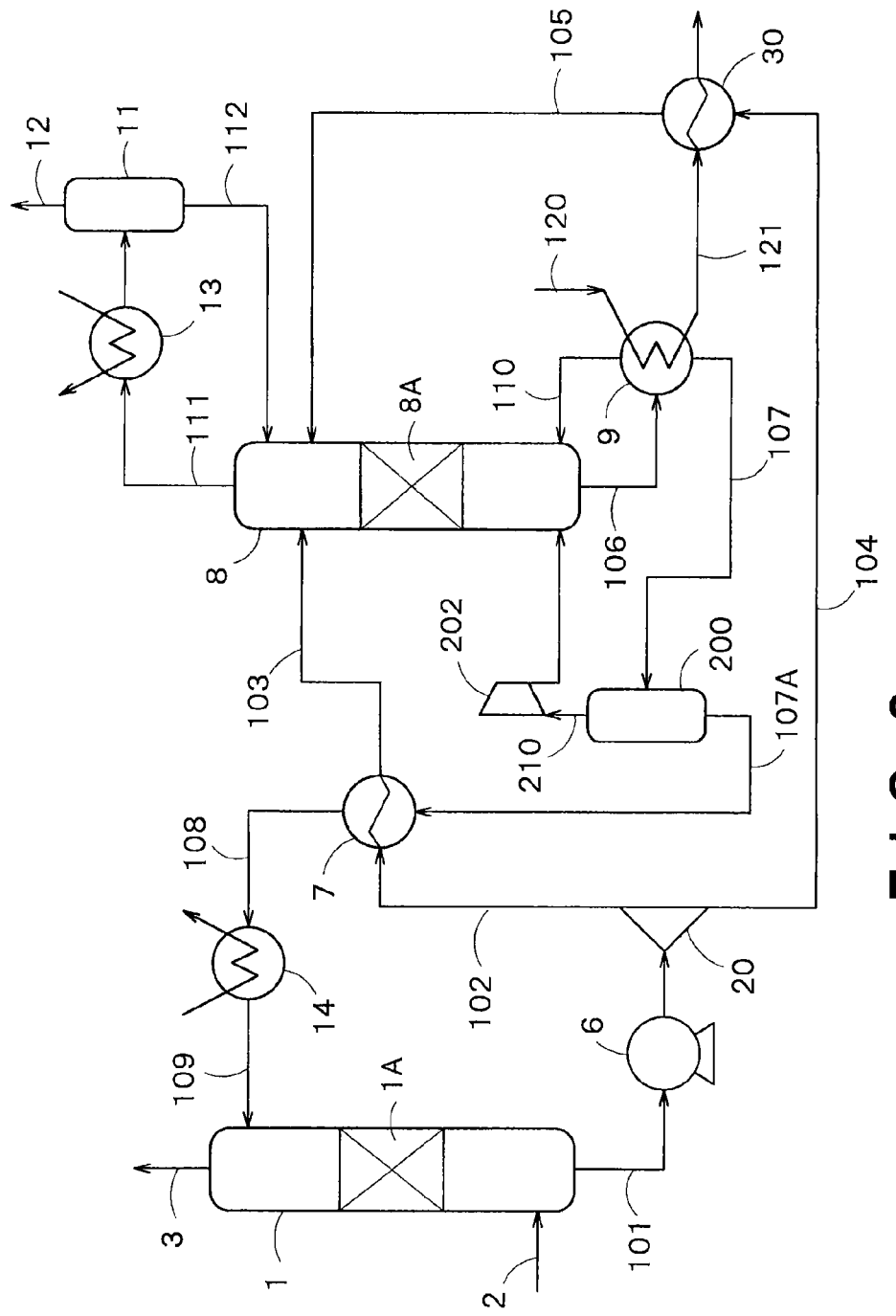
FIG. 2 is a schematic configuration diagram of a carbon dioxide separating and capturing system of a second embodiment.

FIG. 2 is a schematic configuration diagram of a carbon dioxide separating and capturing system of a second embodiment. The carbon dioxide separating and capturing system of the present embodiment is different in that a flash drum 200 and a compressor 202 are provided compared with the first embodiment shown in FIG. 1.

The lean liquid 107 discharged from the reboiler 9 is fed to the flash drum 200. The flash drum 200 flashes the lean liquid 107 at 1 atm and separates it into a mixture gas 210 of the carbon dioxide and steam and a flash liquid (lean liquid) 107A. In other words, the flash drum 200 reduces a pressure of the lean liquid 107 to evaporate and causes gas-liquid separation into the mixture gas 21D and the flash liquid 107A.

The flash liquid 107A heats the main rich liquid 102 at the regenerative heat exchanger 7, and is then cooled by the lean liquid cooler 14 to be fed to the upper portion of the absorption tower 1.

The mixture gas 210 discharged from the flash drum 200 is compressed approximately up to the pressure in the regeneration tower 8 by the compressor 202 to be fed to a lower portion of the regeneration tower 8.

In this way, the mixture gas 210 generated by flashing the lean liquid 107 is fed to the regeneration tower 8, so that an extent of heat at the reboiler 9 can be reduced and a feed of the steam 120 to the reboiler 9 can further be reduced.

Figure 3:
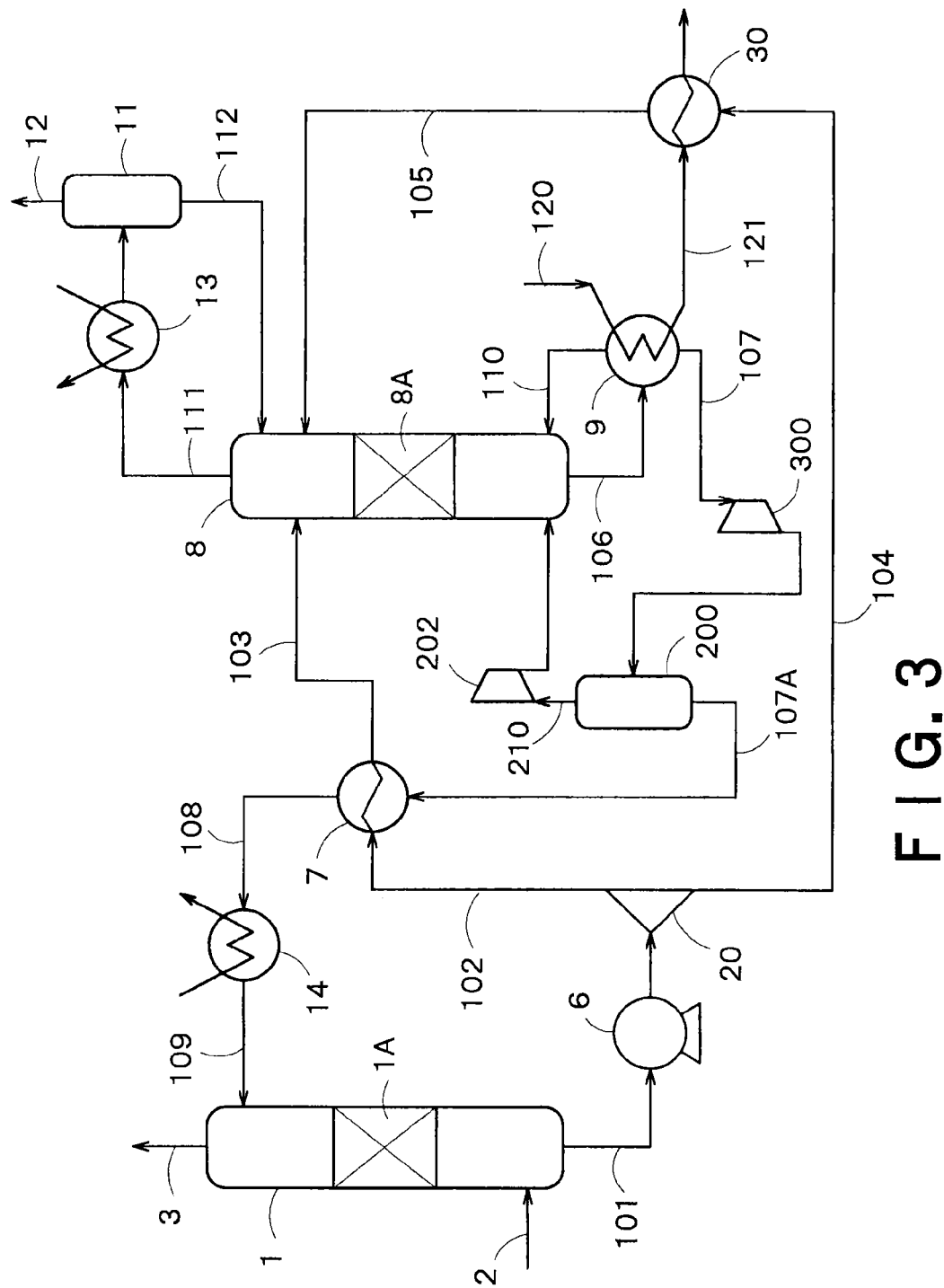
FIGS. 3 to 7 are schematic configuration diagrams of carbon dioxide separating and capturing systems of modified embodiments.

In the above-mentioned second embodiment, as shown in FIG. 3, a hydroelectric turbine 300 may be provided between the reboiler 9 and the flash drum 200 to perform power recovery from the pressure of the lean liquid 107 with the hydroelectric turbine 300 before flashing the lean liquid 107.

Figure 4:
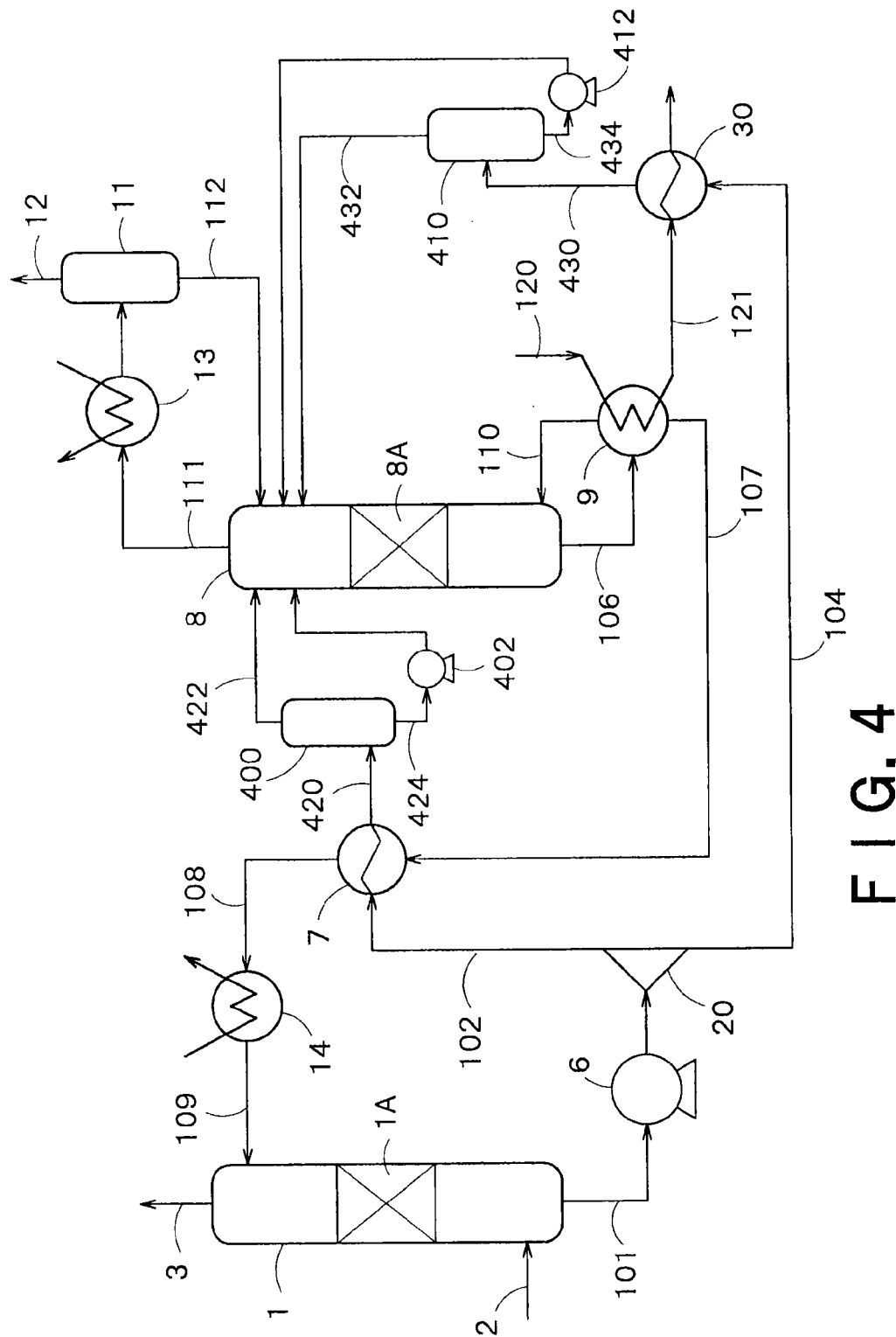
Figure 5:
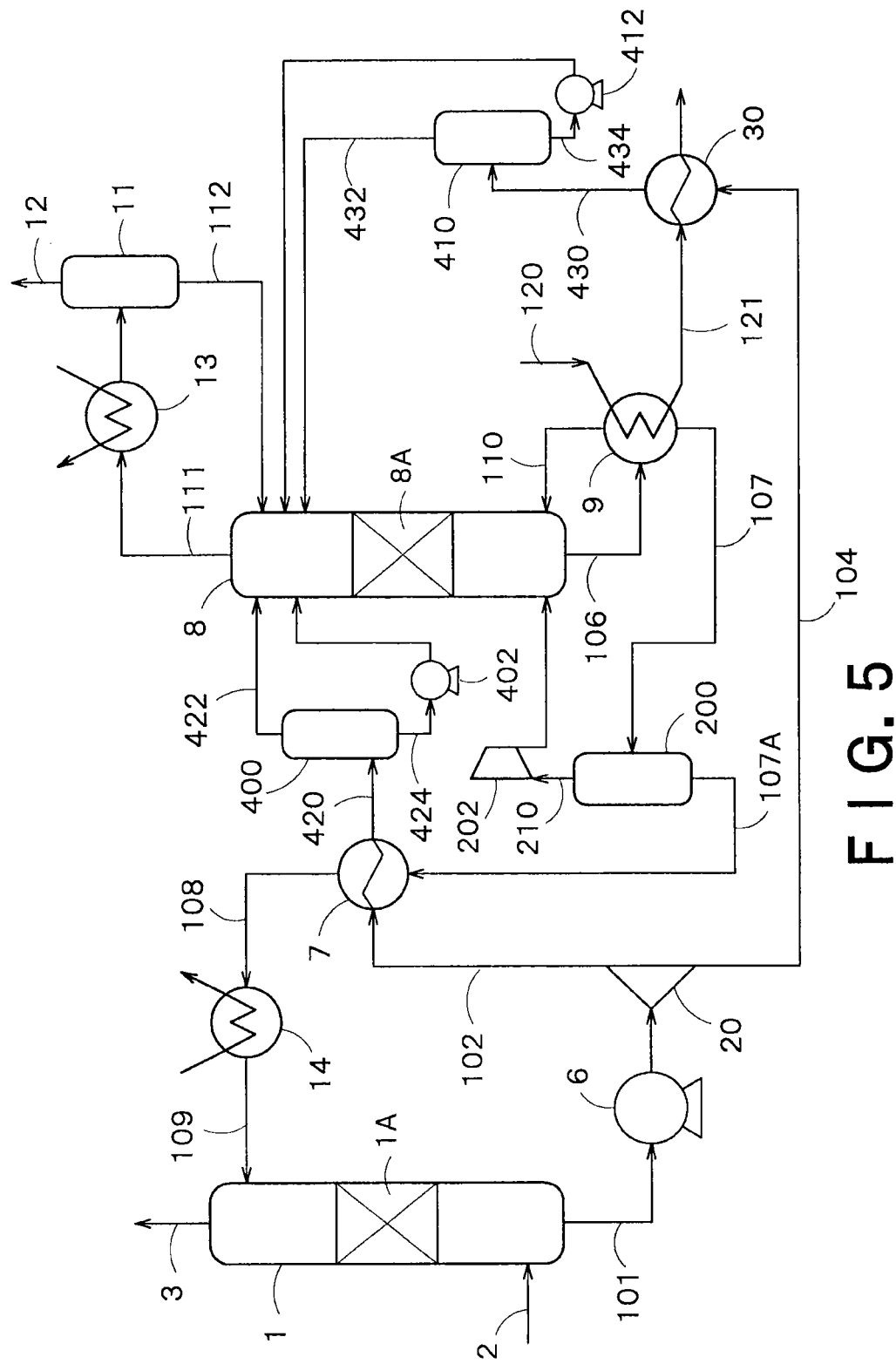

In the above-mentioned first and second embodiments, the main rich liquid 102 and the sub-rich liquid 104 are converted to two-phase states at the regenerative heat exchanger 7 and the heat exchanger 30, respectively. Then, due to the resulting heat of vaporization, heat recovery from the lean liquid 107 (flash liquid 107A) and the hot water 121 may be increased, respectively. In this case, gas-liquid separators may be provided for gas-liquid separation on the two phase flows of gases and liquids downstream of the regenerative heat exchanger 7 and the heat exchanger 30. FIGS. 4 and 5 show examples of gas-liquid separators 400 and 410 provided downstream of the regenerative heat exchanger 7 and the heat exchanger 30 in the carbon dioxide separating and capturing system of the first and second embodiments, respectively.

Two phase flows 420 and 430 of gases and liquids discharged from the regenerative heat exchanger 7 and the heat exchanger 30 are separated into gas phase components 422 and 432 (mixture gases of the carbon dioxide and steam) and liquid phase components 424 and 434 (rich liquids) by the gas-liquid separators 400 and 410. The gas phase components 422 and 432 are directly fed to the regeneration tower 8 and the liquid phase components 424 and 434 are fed to the upper portion of the regeneration tower 8 with pumps 402 and 412.

Figure 6:
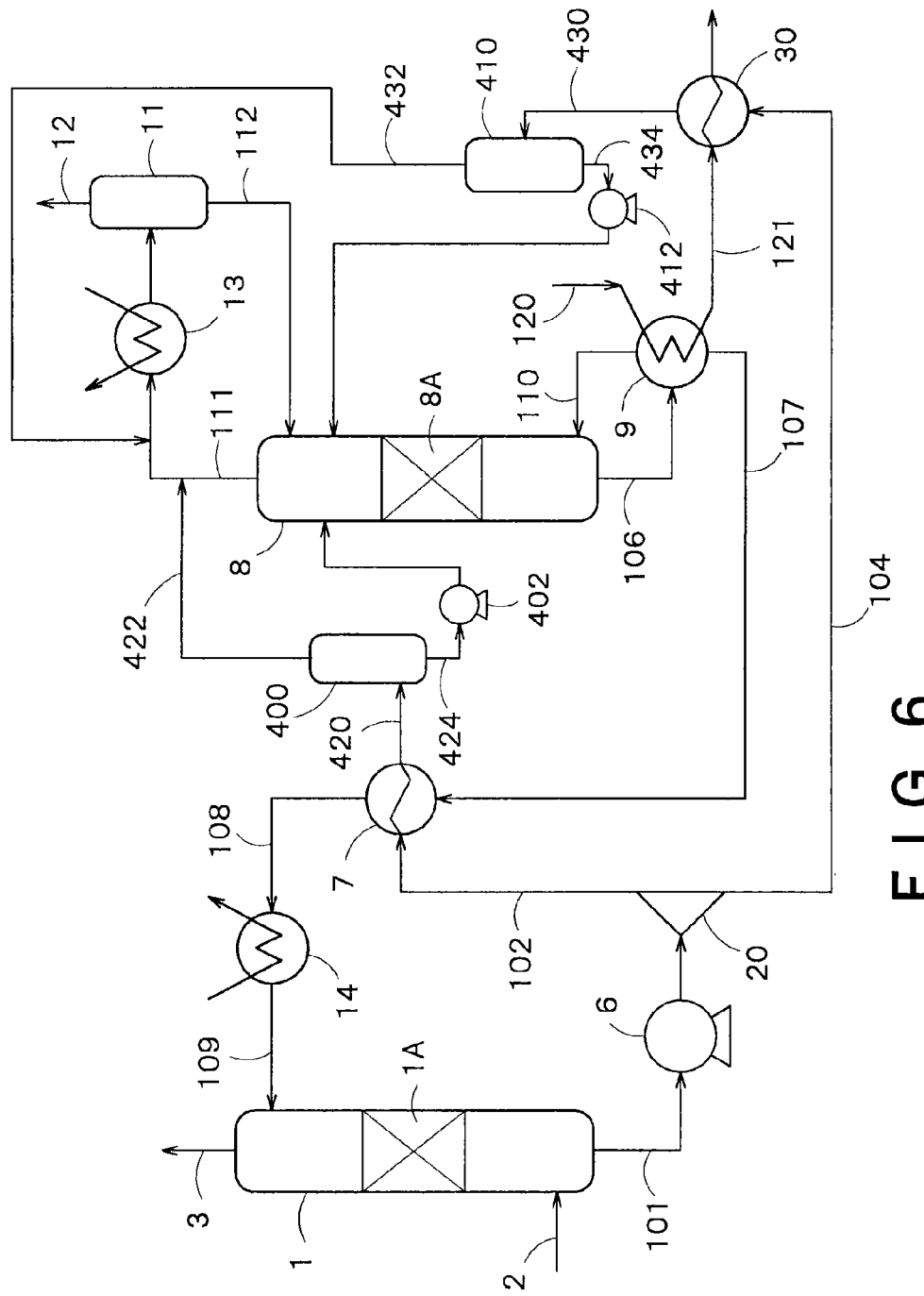
Figure 7:
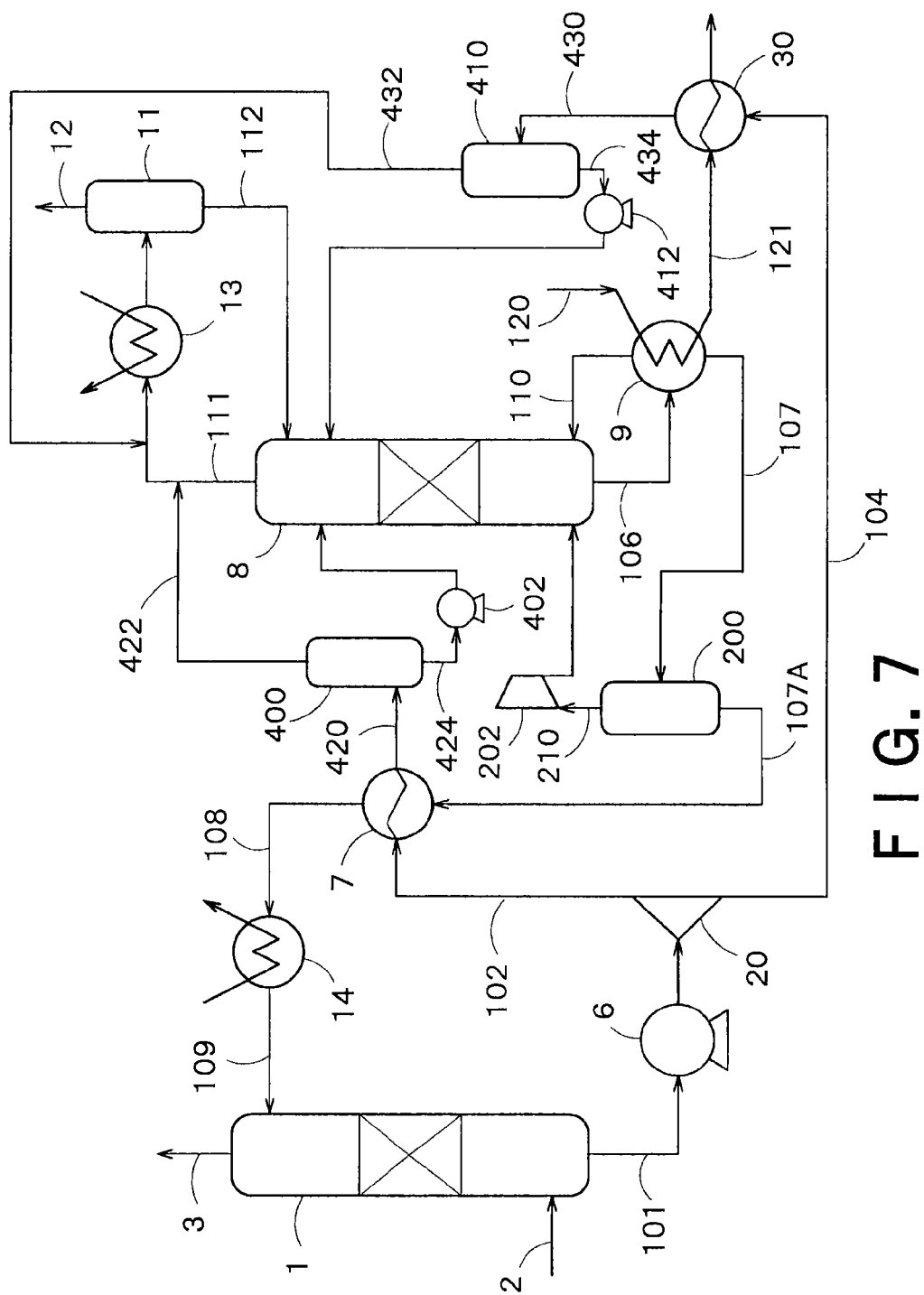

As shown in FIGS. 6 and 7, the gas phase components 422 and 432 may be fed not to the regeneration tower 8 but to the regeneration tower reflux condenser 13 by merging them with the exhaust gas 111 discharged from the regeneration tower 8.

According to at least one of the embodiments described above, an amount of the steam fed to the reboiler can be reduced.

While certain embodiments have been described, these embodiments have been presented by way of example only, and are not intended to limit the scope of the inventions. Indeed, the novel systems and methods described herein may be embodied in a variety of other forms; furthermore, various omissions, substitutions and changes in the form of the systems and methods described herein may be made without departing from the spirit of the inventions. The accompanying claims and their equivalents are intended to cover such forms or modifications as would fall within the scope and spirit of the inventions.

The invention claimed is:

1. A carbon dioxide separating and capturing system comprising:
   an absorption tower to which a gas containing carbon dioxide is introduced, the absorption tower being configured to allow the gas to contact with an absorption liquid for absorbing the carbon dioxide, and to discharge a first rich liquid which is the absorption liquid having absorbed the carbon dioxide;

a regeneration tower configured to cause the absorption liquid to release a gas containing the carbon dioxide, and to discharge a lean liquid whose carbon dioxide concentration is lower than a carbon dioxide concentration of the rich liquid;

a reboiler configured to heat the absorption liquid in the regeneration tower by using steam;

a flow divider configured to divide the first rich liquid into a second rich liquid and a third rich liquid;

a first heat exchanger configured to heat the second rich liquid fed from the flow divider to the regeneration tower to convert the second rich liquid into two phases by using the lean liquid fed from the regeneration tower to the absorption tower; and a second heat exchanger configured to heat the third rich liquid fed from the flow divider directly into the second heat exchanger and fed to the regeneration tower to convert the third rich liquid into two phases by using water discharged from the reboiler.

2. The system of claim 1, wherein the flow divider is configured to divide the first rich liquid fed from the absorption tower into the flow divider through no heat exchanger into the second rich liquid and the third rich liquid.

3. The system of claim 1, further comprising:
a first gas-liquid separator configured to separate a two phase flow of a gas and a liquid discharged from the first heat exchanger into a gas phase component and a liquid phase component; and a first pump configured to feed the liquid phase component discharged from the first gas-liquid separator to the regeneration tower.

4. The system of claim 3, wherein the gas phase component discharged from the first gas-liquid separator is merged with a gas discharged from the regeneration tower.

5. The system of claim 1, further comprising:
a second gas-liquid separator configured to separate a two phase flow of a gas and a liquid discharged from the second heat exchanger into a gas phase component and a liquid phase component; and a second pump configured to feed the liquid phase component discharged from the second gas-liquid separator to the regeneration tower.

6. The system of claim 5, wherein the gas phase component discharged from the second gas-liquid separator is merged with a gas discharged from the regeneration tower.

7. The system of claim 1, further comprising:
a flash drum configured to flash the lean liquid discharged from the regeneration tower and to separate lean liquid into a mixture gas of the carbon dioxide and steam and a flash liquid; and a compressor configured to compress the mixture gas discharged from the flash drum to feed the mixture gas to the regeneration tower, wherein the first heat exchanger heats the second rich liquid by using the flash liquid discharged from the flash drum.

8. The system of claim 7, further comprising a hydroelectric turbine provided between the regeneration tower and the flash drum, and configured to be driven by the lean liquid discharged from the regeneration tower.

9. A method of operating a carbon dioxide separating and capturing system, comprising:
introducing a first gas containing carbon dioxide to an absorption tower;

allowing the first gas to contact with an absorption liquid to allow the absorption liquid to absorb the carbon dioxide in the first gas in the absorption tower, discharging a first rich liquid which is the absorption liquid having absorbed the carbon dioxide, and discharging a second gas whose carbon dioxide content is lower than a carbon dioxide content of the first gas;

dividing the first rich liquid into a second rich liquid and a third rich liquid by a flow divider;

causing the absorption liquid to release a third gas containing the carbon dioxide in a regeneration tower, and discharging a lean liquid whose carbon dioxide concentration is lower than a carbon dioxide concentration of the first rich liquid;

heating the absorption liquid in the regeneration tower by a reboiler using steam;

heating, by a first heat exchanger, the second rich liquid fed from the flow divider to the regeneration tower to convert the second rich liquid into two phases by using, as a heat source, the lean liquid fed from the regeneration tower to the absorption tower; and heating, by a second heat exchanger, the third rich liquid fed from the flow divider directly into the second heat exchanger and fed to the regeneration tower to convert the third rich liquid into two phases by using, as a heat source, water discharged from the reboiler.

10. The method of claim 9, wherein the flow divider is configured to divide the first rich liquid fed from the absorption tower into the flow divider through no heat exchanger into the second rich liquid and the third rich liquid.

* * * * *